United States Patent [19]

Hoshihara

[11] Patent Number: 5,547,254
[45] Date of Patent: Aug. 20, 1996

[54] PAWL AND RATCHET TYPE SEAT TILT CONTROL APPARATUS

[75] Inventor: Naoaki Hoshihara, Nagoya, Japan

[73] Assignee: Aisin Seiki Kabushiki Kaisha, Japan

[21] Appl. No.: 127,575

[22] Filed: Sep. 28, 1993

[30] Foreign Application Priority Data

Sep. 30, 1992 [JP] Japan .................................. 4-283593
Sep. 30, 1992 [JP] Japan .................................. 4-283594

[51] Int. Cl.⁶ ..................................................... B60N 2/22
[52] U.S. Cl. ...................... 297/367; 297/369; 297/378.12
[58] Field of Search ................................... 297/367, 368, 297/369, 378.12

[56] References Cited

U.S. PATENT DOCUMENTS

| 3,309,139 | 3/1967 | Turner et al. | 297/367 |
| 3,727,978 | 4/1973 | Barriere et al. | 297/369 |
| 4,384,744 | 5/1983 | Barley | 297/367 |
| 4,394,048 | 7/1983 | Sakarai et al. | 297/378.12 |
| 4,660,886 | 4/1987 | Terada et al. | |
| 4,770,463 | 9/1988 | Nishino | 297/367 |
| 4,874,205 | 10/1989 | Arefinejad et al. | 297/367 |

FOREIGN PATENT DOCUMENTS

| 223979 | 1/1959 | Australia | 297/369 |
| 61-29322 | 8/1986 | Japan . | |
| 149986 | 5/1955 | Switzerland | 297/369 |

*Primary Examiner*—Richard A. Bertsch
*Assistant Examiner*—Roland G. McAndrews
*Attorney, Agent, or Firm*—Finnegan, Henderson, Farabow, Garrett & Dunner, L.L.P.

[57] ABSTRACT

A seat reclining apparatus includes a release lever provided on one side of a pair of lower arms, a lever corresponding to the release lever provided on the other side of the pair of lower arms, a connecting bar consisting of a torsion rod connecting the two levers, and a pawl cooperating with each lever. A cam member is combined with each pawl by being placed in a cam slot of the pawl, the combination is provided on both lower arms and the cam members are connected by the connecting rod. The release lever is connected solely to one of the cam members.

4 Claims, 5 Drawing Sheets

PAWL AND RATCHET TYPE SEAT TILT CONTROL APPARATUS

BACKGROUND OF THE INVENTION

1. Field of the Invention

This invention relates to a seat reclining apparatus having a pawl and a ratchet.

2. Description of the Prior Art

As shown in FIG. 5, a seat used in an automotive vehicle has a lower arm 1 on both sides of a seat for supporting a seat cushion (not shown), and an upper arm 2 on both sides of the seat for supporting a seat back (not shown). A reclining apparatus 3 is mounted on both ends of a connecting rod 4 that connects the arms 1, 2 on both sides of the seat.

Each reclining apparatus 3 has at least a ratchet 5 secured to the lower portion of the corresponding upper arm 2, a release lever 7 supported on the connecting rod 4 and acted upon by the biasing force of a spring 6, and a pawl 8 pivoted on the corresponding lower arm 1 so as to be free to engage the ratchet 5. The reclining apparatus 3 is provided on each side of the seat.

In the example of FIG. 5, the release lever 7 is provided with a cam slot 9, a pin 10 fixed to the pawl 8 is mated with the cam slot 9, and a ring 11 pivotally supported on the release lever 7 is brought into sliding contact with a cam surface 12 on the side face of the pawl 8.

When the release lever 7 is lifted, the position of the cam slot 9 moves as the ring 11 moves along the cam surface 12, and the position of the pin 10 is changed owing to the movement of the cam slot 9, whereby the ratchet 5 and the pawl 8 are caused to disengage. As a result, the upper arm 2 is allowed to turn freely relative to the lower arm 1 and may be turned about the connecting rod 4 to any desired attitude. The release lever 7 is then returned to its original position to reengage the ratchet 5 and pawl 8 and establish the fixed relation between the arms 1, 2.

Another arrangement is known in which the cam slot 9 is provided in the pawl 8 and the pin 10 is fixed. In still another known arrangement, the slot 9 and pin 10 are eliminated and the movement of the pawl 8 is made to follow up the operation of the release lever 7 solely by the ring 11.

For the details of such prior-art arrangements of reclining apparatus, refer to the specifications of Japanese Utility Model Publication No. 61-29322 and U.S. Pat. No. 4,660,886.

The arrangement illustrated in FIG. 5 is provided symmetrically on the lower arms on both sides of the seat. The motion of one release lever, which is provided with a handle, is transmitted to the other release lever, which is devoid of a handle, via the connecting rod. Further, it is required that each release lever have a spring for strengthening the engagement between the pawl and ratchet.

In particular, the spring interposed between each lower arm and each release lever takes up the limited amount of space available around the seat and hampers a degree of freedom in terms of seat design.

Furthermore, as will be understood from the illustrated example of the prior art, the motion of the pawl always follows up the motion of the release lever. Accordingly, a lever corresponding to the release lever on one side of the seat is disposed on the other side of the seat, this lever and the pawl on the other side are operatively associated, and it is required that both levers be moved in unison by the connecting rod.

This conventional arrangement is disadvantageous in that width is increased by an amount equivalent to the lever on the other side.

SUMMARY OF THE INVENTION

Accordingly, a first object of the present invention is to provide a seat reclining apparatus that provides more space around the seat.

A second object of the present invention is to provide a seat reclining apparatus the width whereof can be reduced.

A characterizing feature of the first aspect of the invention is that the connecting rod between the two lower arms is made of a torsion bar, which has resilience in the direction of torsion, the phase angle of the torsion bar being advanced on a linked side.

More specifically, according to the present invention, the first object is attained by providing a seat reclining apparatus comprising a pawl pivotally supported on each of a pair of spaced lower arms, a ratchet secured to each of a pair of spaced upper arms, a release lever for engaging and disengaging the pawls and the corresponding ratchets, and a connecting rod for transmitting motion of the release lever at the side of one lower arm to a member of the other lower arm, the connecting rod having resilience in a torsional direction and advancing a phase angle thereof on a linked side.

In a preferred embodiment, both ends of the connecting rod are supported on the lower arms, cam members are provided on both ends of the connecting rod and are disposed in cam slots of the corresponding palws. One cam member is turned by the release lever, and turning of this cam member is transmitted to the other cam member via the connecting rod. Furthermore, both ends of the connecting rod are supported on the pair of lower arms, and one end of the release lever is associated with one end of the connecting rod.

In this arrangement, torsion of the torsion bar constituting the connecting rod acts in a direction that strengthens the engagement between the pawl and the ratchet, thereby making it possible to dispense with a spring biasing force for the release lever. As a result, more space is made available around the seat.

A characterizing feature of the second aspect of the invention is that a cam member is disposed in a cam slot of each pawl, and the cam member is operated by the release lever on the side of one lower arm. The cam members disposed in both lower arms are connected by the connecting rod.

More specifically, according to the present invention, the second object is attained by providing a seat reclining apparatus comprising a pair of spaced lower arms, a connecting rod both ends of which are supported on the pair of lower arms so that the connecting rod is free to rotate, a cam member secured to each end of the connecting rod, a pawl one end of which is fastened by a pin to each lower arm, each pawl having a cam slot for receiving the corresponding cam member, a ratchet secured to each upper arm for engaging with and disengaging from the corresponding pawl, and a single release lever pivotally supported on one lower arm and having a slot for receiving a pin fixed to one cam member.

Preferably, the release lever and a spring for biasing the release lever are disposed on an outer side of one of the lower arms and the other members are situated on the inner side of the lower arm.

According to a third aspect of the present invention, there is provided a seat reclining apparatus comprising a pair of spaced lower arms, a connecting rod both ends of which are supported on the pair of lower arms so that the connecting rod is free to rotate, cam members secured to each end of the connecting rod, pawls one end of which each is fastened by a pin to each lower arm, each pawl having a cam slot for receiving the corresponding cam member, ratchets secured to each upper arm for engaging with and disengaging from the corresponding pawl, and a single release lever secured to said cam member.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
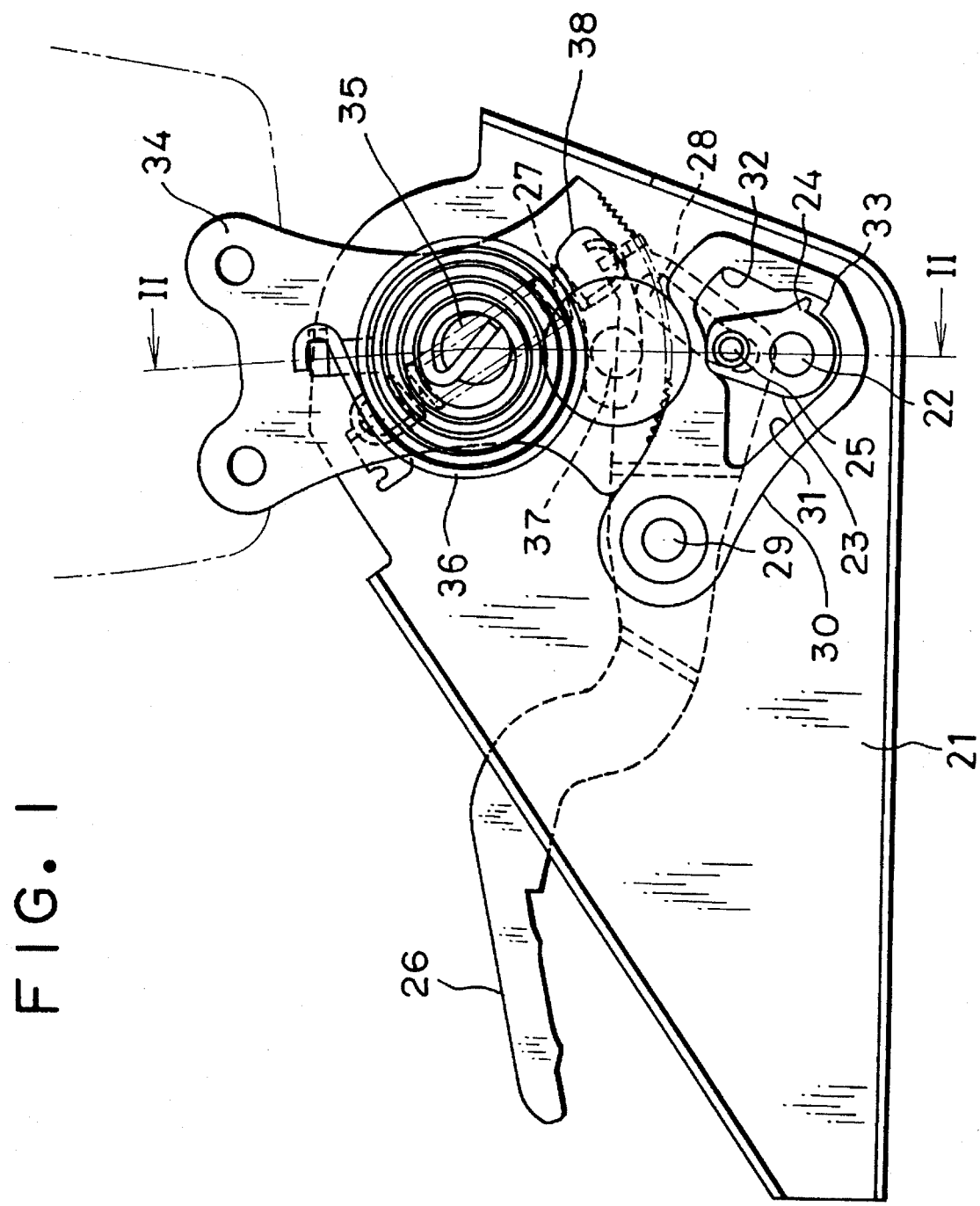
FIG. 1 is a side view showing one lower arm in a seat reclining apparatus according to a first embodiment of the present invention.
Figure 2:
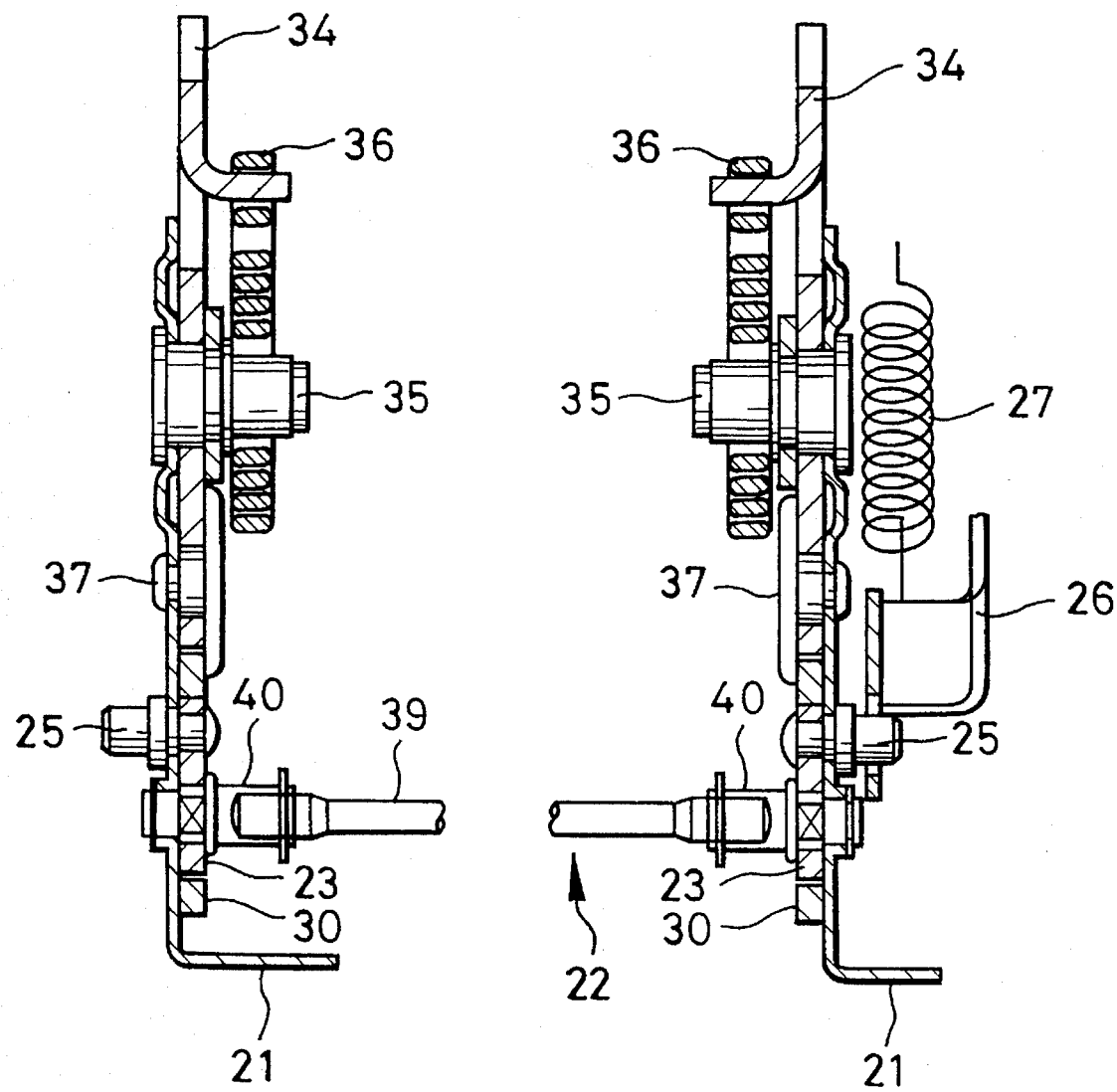
FIG. 2 is a sectional view taken along line II—II in FIG. 1.
Figure 3:
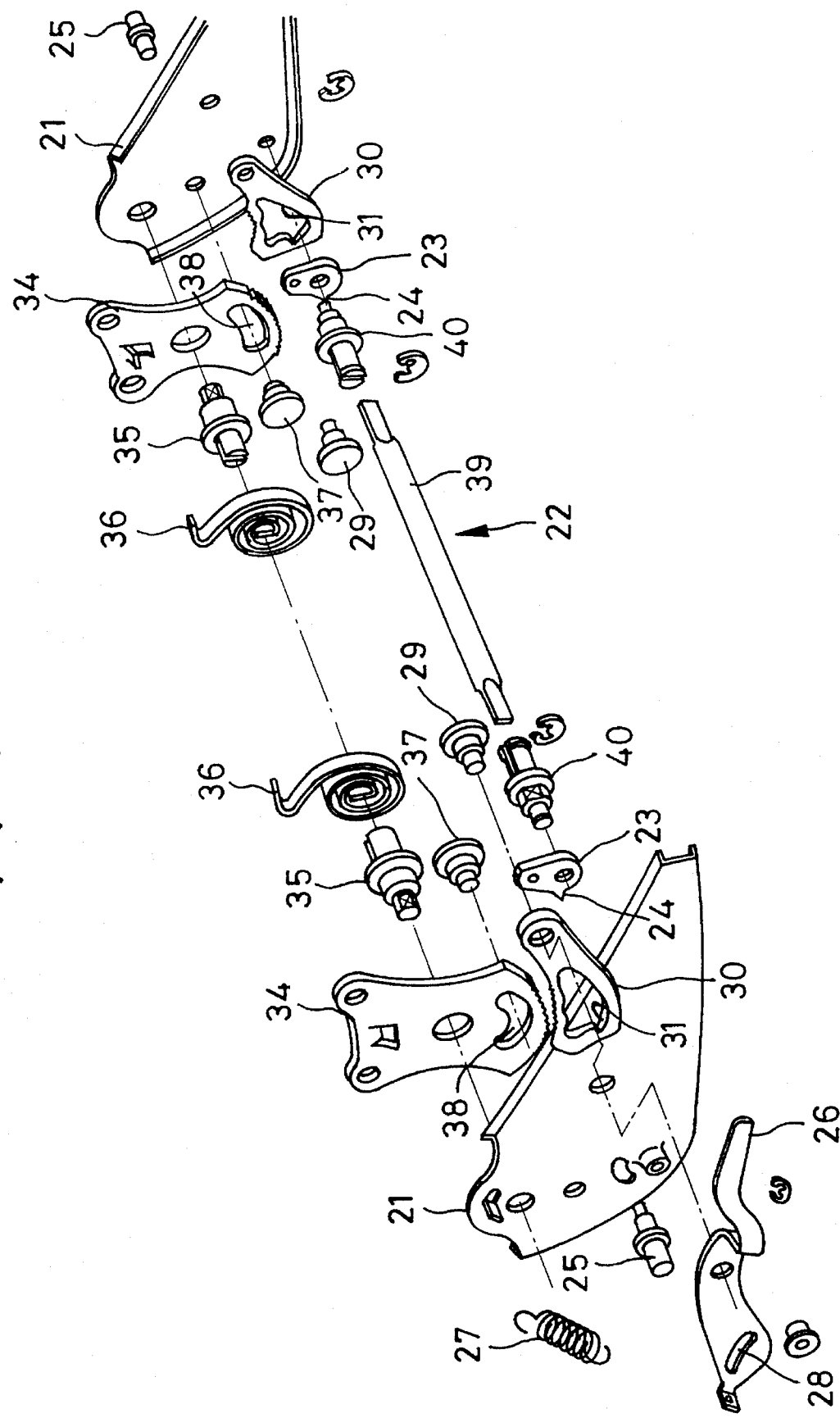
FIG. 3 is an exploded view showing the seat reclining apparatus according to a first embodiment of the present invention.

Preferred embodiments of the present invention will now be described with reference to the accompanying drawings.

Both ends of a connecting rod 22 are supported on a pair of spaced lower arms 21 in such a manner that the connecting rod 22 is free to rotate. A cam member 23 is secured to each end of the connecting rod 22 inwardly of the corresponding lower arm 21. Each cam member 23 is a flat, generally oval-shaped member having a projection 24 on one side. A pin 25 secured to each cam member 23 is passed through the corresponding lower arm 21 and one of the pins 25 is inserted into a slot 28 formed in a release lever 26. Thus, the release lever 26 and the corresponding cam member 23 are operatively associated and the release lever 26 is supported on one of the pins 25. The release lever 26 is acted upon by the biasing force of a spring 27 and the stroke thereof is decided by the combination of the slot 28 and pin 25. The release lever 26 is disposed solely on the outer side of one of the lower arms 21 and is free to turn about a pin 29, which is supported on the lower arm 21, within a stroke range decided by pin 25 and the slot 28. The cam member 23 turns about the connecting rod 22 in conformity with the engagement between the slot 28 and the pin 25.

The pin 29 supports a pawl 30 inwardly of the corresponding lower arm 21. Each pawl 30 has teeth on its upper side and cam hole 31 at its center. The cam hole 31 has a stepped cam face 32 and a recess 33. The cam member 23 is arranged in the cam hole 31 so that when the upper surface of the cam member 23 is brought into abutting contact with the lower surface of the stepped cam face 32, the pawl 30 will assume a lower position.

Ratchets 34 secured to upper arms (not shown) are freely rotatably supported on respective lower arms 21 via respective pins 35 and spiral springs 36. A pin 37 fixed to each lower arm 21 is inserted into a slot 38 of the corresponding ratchet 34 to limit the turning angle of the ratchet. A toothed portion on each ratchet 34 opposes the toothed portion of the corresponding pawl 30.

The connecting rod 22 comprises a torsion bar 39, which possesses resilience in the direction of torsion, and mounting portions 40 at its two ends. Each end of the torsion bar 39 is flattened, the flattened end is inserted into a recess of the corresponding mounting portion 40 and the mounting portion 40 is secured to the flattened end by an E ring.

The phase angle on the linked side of the torsion bar 39 is advanced and the cam members 23 are biased in the counter-clockwise direction in FIG. 1 to strengthen the abutting contact between the upper surface of each cam member 23 and the lower surface of the cam face 32 of the corresponding pawl 30. This is assisted by the spring 27 to strengthen the engagement between the ratchet 34 and the corresponding pawl 30.

When the ratchet 34 and pawl 30 shown in FIG. 1 are in the engaged state, i.e., when the lower arm 21 and upper arm are in a fixed relation, lifting the release lever 26 causes the release lever 26 to turn about the pin 29 so that the slot 28 in the release lever 26 turns the pin 25 in the clockwise direction. This turning motion is transmitted to the cam members 23 and connecting rod 22 so that the upper surfaces of the two cam members 23 move to the upper surface sides of the cam surfaces 32 of the pawls 30, thereby disengaging the pawls 30 from the ratchets 34 so that the seat back is capable of being reclined. The projections 24 of the cam members 23 engage with the recesses 33 of the corresponding pawls 30 to stop the turning of the cam members 23.

After the seat back is set at the desired position, the release lever 26 is urged downward to the state shown in FIG. 1 by utilizing the spring 27 and the torsion of the torsion bar 39. In this way the ratchets 34 and corresponding pawls 23 are engaged to fix the seat back relative to the seat cushion.

Figure 5:
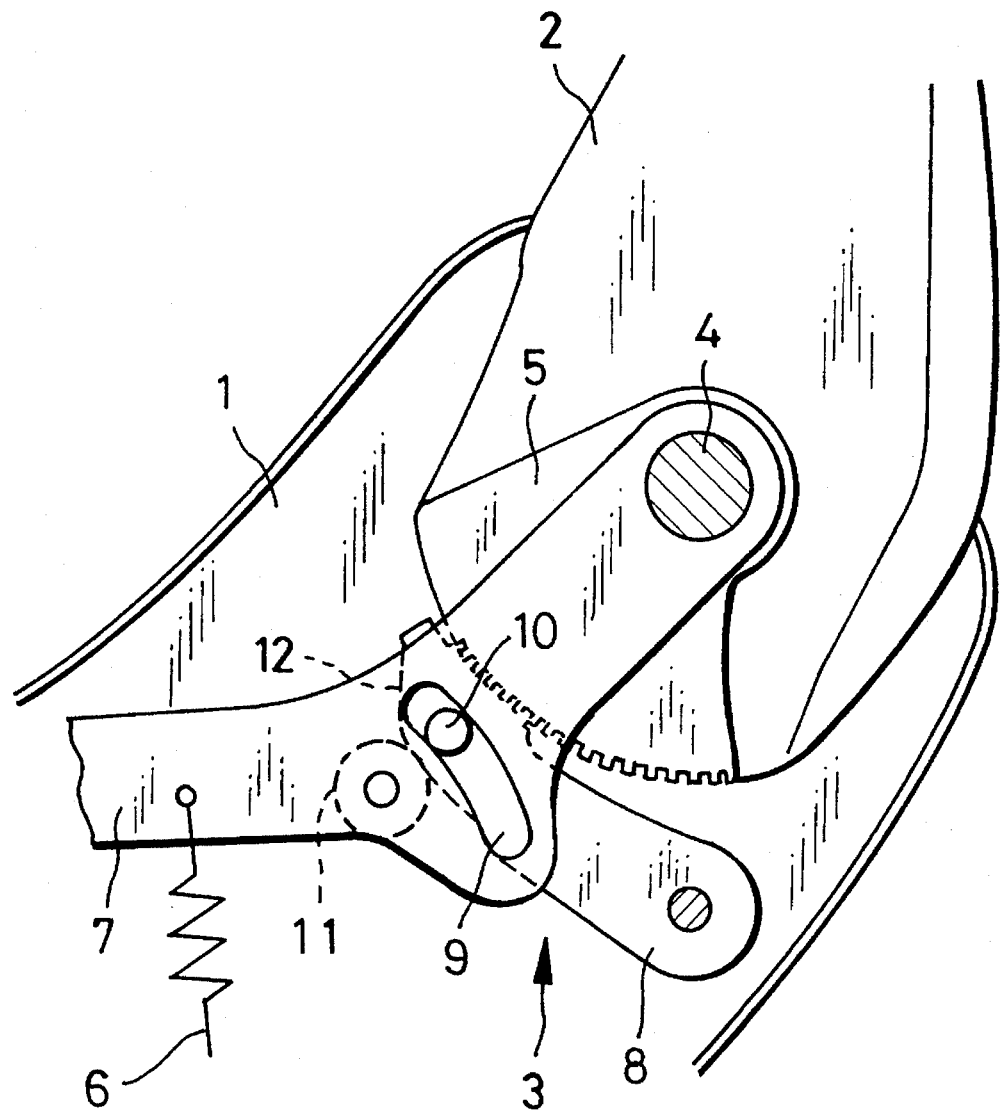
FIG. 5 is a partial front view showing a seat reclining apparatus according to the prior art.

The torsion bar 39 having torsion used in the illustrated embodiment is capable of being applied also to the connecting rod 4 of the prior art shown in FIG. 5.

Figure 4:
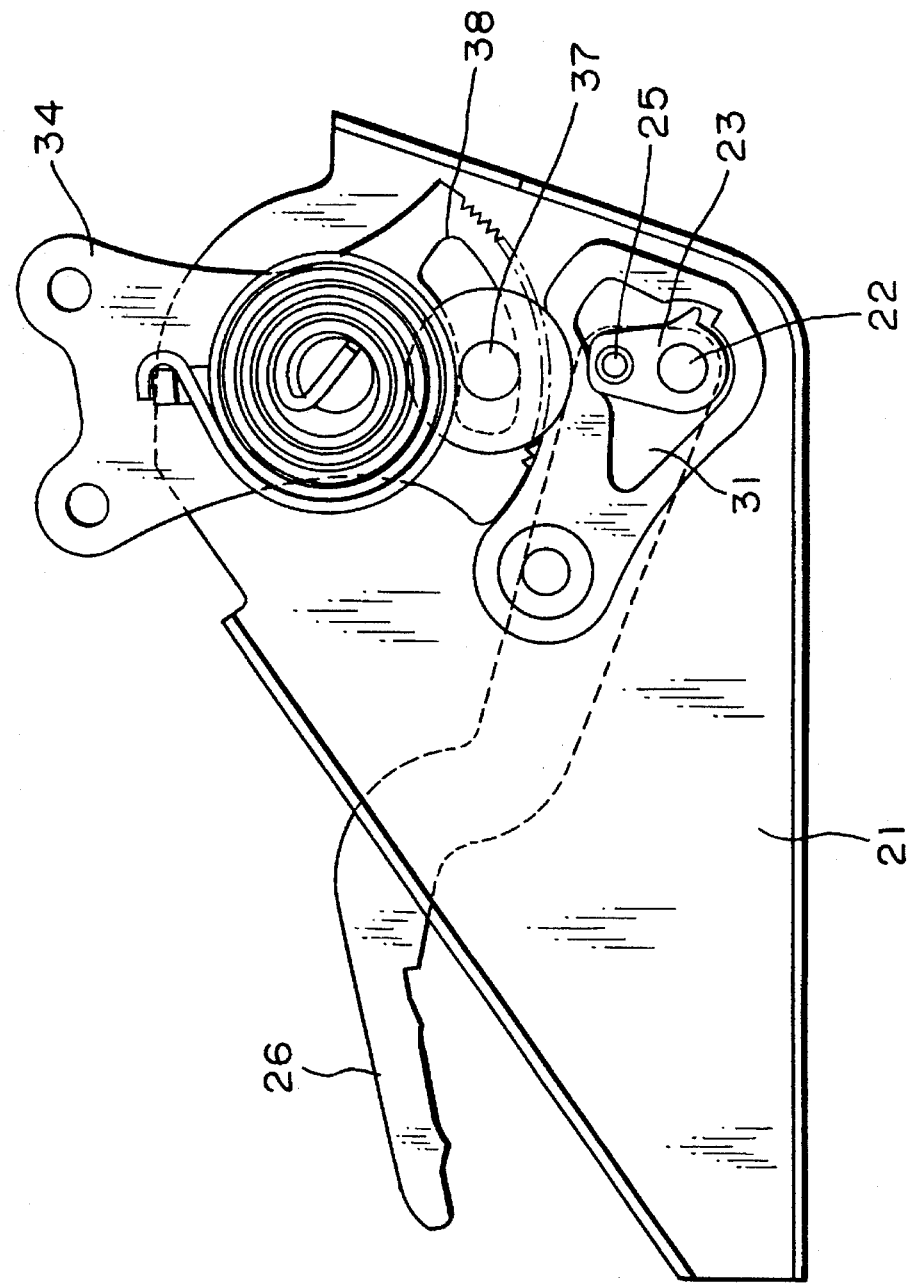
FIG. 4 is a front view showing a seat reclining apparatus according to a second embodiment of the present invention.

FIG. 4 illustrates another embodiment of the present invention. In this embodiment, one end of the connecting rod 22 is made the center of rotation of the release lever 26, and the cam member 23 is fixed to the release lever 26 using the pin 25. The slot 28 is eliminated from the release lever 26, and instead of the pin 29 being fixed to the release lever 26, the release lever is secured to the pin 25. In other respects, this arrangement is substantially the same as that of the first embodiment shown in FIG. 1. In this embodiment, sliding resistance between the pin 25 and the slot 28 is excluded and the rotational torque from the release lever 26 is capable of being transmitted to the connecting shaft 22 and cam member 23.

In accordance with the present invention, the release lever is disposed solely on the side of one of the pair of lower arms and the cam member is disposed within the cam slot of the pawl. This makes it possible to reduce width.

In addition, since the release lever is disposed on the outer side of the lower arm and another member is disposed on the inner side of the lower arm, the space available around the seat can be utilized effectively.

As many apparently widely different embodiments of the present invention can be made without departing from the spirit and scope thereof, it is to be understood that the invention is not limited to the specific embodiments thereof except as defined in the appended claims.

What is claimed is:

1. A pawl and ratchet type seat tilt control apparatus comprising:

a pair of spaced lower arms;

a connecting rod, each end of which is supported on one of said lower arms so that said connecting rod is free to rotate;

a pair of cam members, one cam member secured to one end of said connecting rod, the other cam member secured to the other end of said connecting rod;

a pair of pawls, each pawl having one end fastened by a pin to a corresponding lower arm, each pawl having a cam slot for receiving a corresponding cam member wherein movement of said release lever provides for movement of said cam members which results in said engagement and disengagement;

a pair of ratchets, each ratchet configured to be secured to an upper arm, for engaging with and disengaging from a corresponding pawl; and a single release lever pivotally supported on one of said lower arms and having a slot for receiving a pin fixed to one of said cam members.

2. The apparatus according to claim 1, wherein one cam member is turned by said release lever, the turning of said one cam member being transmitted to the other cam member via said connecting rod.

3. The apparatus according to claim 1, wherein one end of said release lever operatively connects to one end of said connecting rod.

4. The apparatus according to claim 1, wherein said release lever and a spring for bracing said release lever are disposed on a first side of one of the lower arms, and the corresponding ratchet, pawl, and cam member are disposed on a second side of the lower arm.

* * * * *

UNITED STATES PATENT AND TRADEMARK OFFICE
CERTIFICATE OF CORRECTION

PATENT NO. : 5,547,254
DATED : August 20, 1996
INVENTOR(S) : Naoaki Hoshihara

It is certified that error appears in the above-indentified patent and that said Letters Patent is hereby corrected as shown below:

Claim 1, column 5, line 18, after "member", insert --;--;

Claim 1, column 5, lines 19-21, delete "wherein movement of said release lever provides for movement of said cam members which results in said engagement and disengagement;";

Claim 1, column 6, line 6, after "members", insert --wherein movement of said release lever provides for movement of said cam members which results in said engagement and disengagement--.

Signed and Sealed this

Nineteenth Day of November, 1996

*Attest:*

BRUCE LEHMAN

*Attesting Officer*    *Commissioner of Patents and Trademarks*